(12) United States Patent  
Karapetyan

(10) Patent No.: US 7,937,847 B1
(45) Date of Patent: May 10, 2011

(54) PRECISION LEVEL DEVICE

(76) Inventor: Armen Karapetyan, Los Angeles, CA (US)

( * ) Notice: Subject to any disclaimer, the term of this patent is extended or adjusted under 35 U.S.C. 154(b) by 0 days.

(21) Appl. No.: 12/803,830

(22) Filed: Jul. 7, 2010

(51) Int. Cl.
*G01C 9/00* (2006.01)
(52) U.S. Cl. .................. 33/377; 33/379; 33/351
(58) Field of Classification Search ............. 33/377, 33/379, 351, 353, 378
See application file for complete search history.

(56) References Cited

U.S. PATENT DOCUMENTS

| | | | | |
|---|---|---|---|---|
| 3,269,729 A | * | 8/1966 | Morrison | 33/373 |
| 3,673,696 A | * | 7/1972 | Wasson | 33/348 |
| 3,842,514 A | * | 10/1974 | Scheyer | 33/379 |
| 4,085,515 A | * | 4/1978 | Darden | 33/377 |
| 4,103,430 A | | 8/1978 | Schrader | |
| 5,463,817 A | * | 11/1995 | Leeds | 33/371 |
| 6,095,933 A | * | 8/2000 | Smith | 33/379 |
| 6,098,300 A | * | 8/2000 | Angelucci | 33/451 |
| 6,681,494 B1 | * | 1/2004 | Bowden | 33/379 |
| 6,691,421 B2 | * | 2/2004 | Roth et al. | 33/379 |
| 6,748,666 B2 | | 6/2004 | Zugel et al. | |
| 6,779,276 B1 | * | 8/2004 | Turner | 33/379 |
| 6,968,626 B1 | | 11/2005 | Wondracek | |
| 6,990,742 B1 | * | 1/2006 | Schmidt | 33/377 |
| 2002/0162236 A1 | * | 11/2002 | Roth et al. | 33/379 |

* cited by examiner

Primary Examiner — Yaritza Guadalupe-McCall

(57) ABSTRACT

This invention, precision level device, provides the leveling of the subjects.
An improved precision level device comprises a transparent body including an aperture, a cap, a lower horizontal and upper horizontal walls of the transparent body, the first vertical and second vertical walls of the transparent body, recess, fluid, graduation line(s), horizontal graduation line, vertical graduation line, diagonal graduation line(s), magnetic element, and a front wall of the transparent body.

1 Claim, 4 Drawing Sheets

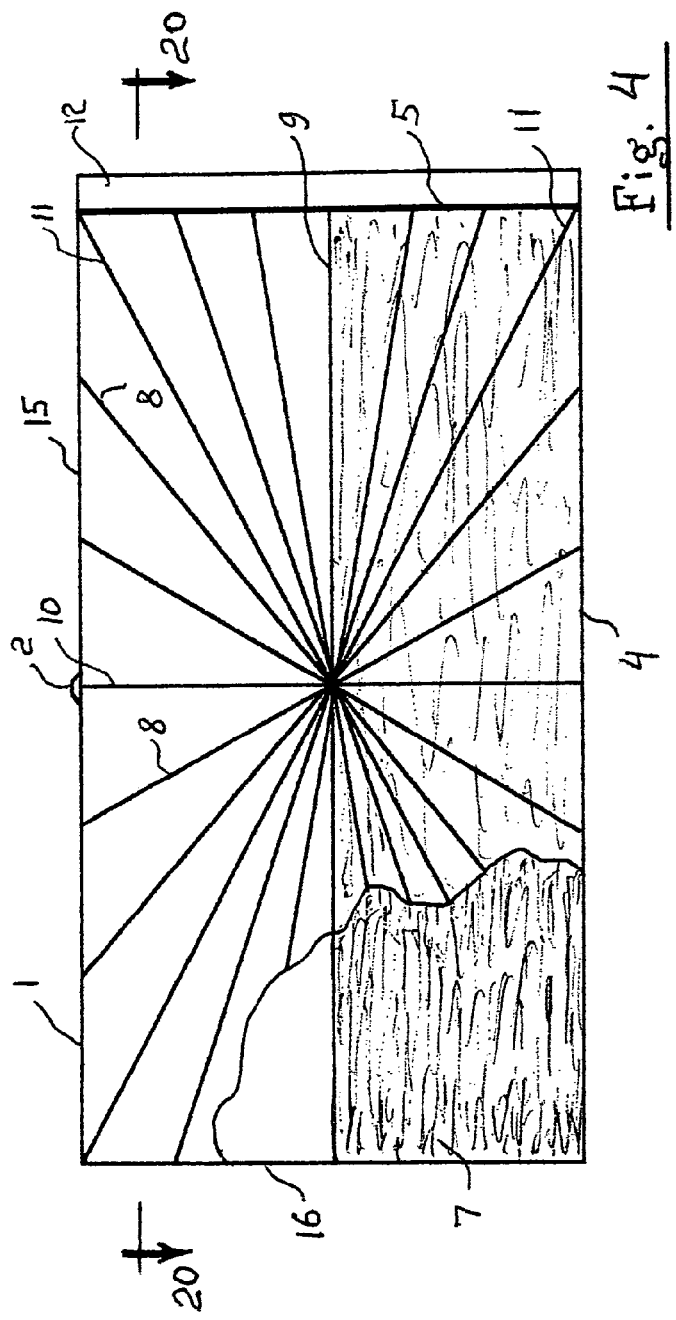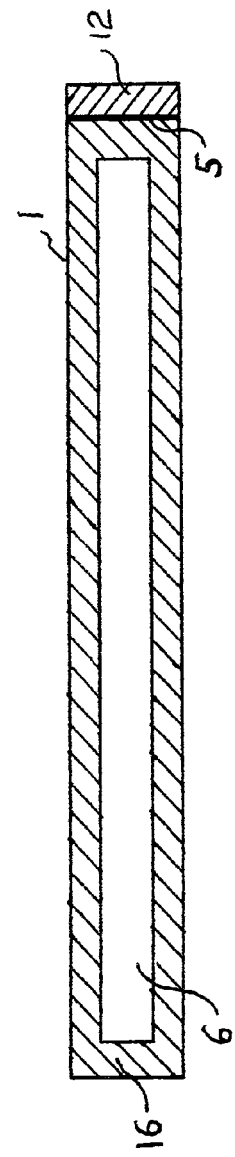
Fig. 4
Fig. 5
20-20

PRECISION LEVEL DEVICE

FIELD OF THE INVENTION

The invention relates to the level devices, and more particularly, to the level devices providing visual evaluation of the desired level.

BACKGROUND OF THE INVENTION

The level devices and alike analogous devices are well known in the field of, for instance, the construction levels, levels in the assembly field, etc. Most wide known devices use the bubble level, in which a bubble of air is trapped within a vial containing a fluid.

The typical levels comprise three vials set at varying angles with respect to an axis of the instrument, typically parallel) (0°), perpendicular)(90°) and at an angle of 45°. The bubble of air, trapped within a vial containing a fluid should be located between the reference marks placed on the vial (usually the tubular means are used as a vial). The vial is sealed and an air bubble floats in a fluid (liquid, water, etc.) contained into that vial. The particular surface is considered horizontal or vertical (or under 45°) when the air bubble rests between the mentioned predetermined graduated marks on the vial (or in the vial).

Such level devices are not efficient and precise when setting a vertical surface with a typical level, the bubble vial is generally perpendicular to the surface being set, with the result that the air bubble must be viewed from a position which does not directly face the surface being set. Unfortunately, it is sometimes awkward or strenuous to view the air bubble from such a position. Also, it is well known that the adverse lighting conditions can also exacerbate difficulty in reading the bubble from such a position.

In order to eliminate such deficiency, the U.S. Pat. No. 4,103,430 describes a viewing device for a level including a luminescent panel and a pivotable mirror arranged to provide an illuminated image of the air bubble which may be viewed without having to look directly at the air bubble vial. However, the air bubble must still be viewed from a position which does not directly face the surface being set.

Further, the U.S. Pat. No. 6,748,666 discloses a spirit level comprising a body having a level face for setting a surface, at least one bubble vial mounted in the body, the bubble vial having a longitudinal axis generally perpendicular to the level face, and an optical transfer element fixed to the body which transfers an image of the bubble vial to a viewing plane generally parallel to the level face.

Generally, the spirit level includes a body having a level face for setting a surface, at least one bubble vial mounted in the body, the bubble vial having a longitudinal axis generally perpendicular to the level face, and an optical transfer element fixed to the body which transfers an image of the bubble vial to a viewing plane generally parallel to the level face. The optical transfer element enlarges the image. The optical transfer element diminishes a size of the image. Illumination apparatus may be provided for illuminating the image. Also, the optical transfer element includes a reflective surface arranged at an angle to the bubble vial and to the viewing plane and which reflects the image of the bubble vial to the viewing plane. The reflective surface may be a mirror or a prism, for example. In accordance with another preferred embodiment of the present invention the optical transfer element includes an electric viewing device. The optical transfer element may be internally or externally mounted in or on the spirit level. Additionally, the optical transfer element may be detachable from the spirit level.

Specifically, spirit level includes one or more bubble vials mounted in body for setting a vertical surface and one or more bubble vials for setting a horizontal surface. Bubble vial preferably has a longitudinal axis generally perpendicular to level face. The optical transfer element is fixed to body which transfers an image of bubble vial to a viewing plane parallel to the surface being set. Viewing plane is preferably located on a face of body parallel to level face. The optical transfer element also includes a reflective surface mounted inside a hollow portion of body at an angle to bubble vial and to viewing plane which reflects the image of bubble vial to viewing plane. Reflective surface is a polished mirror or a prism. The window is cut out on face so that a user can view the image of bubble vial on viewing plane. Optical transfer is provided with optical power (e.g., optical transfer element is curved so as to enlarge or distort an image of bubble vial or is rotatable about an axis of bubble vial).

When the spirit level is tilted at an angle relative to the vertical surface being set, the viewing of the bubbler is more complex.

Another U.S. Pat. No. 6,681,494 describes the bubble level comprising a base and a vial. Generally, the vial includes two inwardly sloped outwardly bowed interior side-walls and a top exterior surface. The interior side-walls are aligned at an approximately 45° angle to the top exterior surface and meet slightly below the top exterior surface at an approximately 90° angle. When a longitudinal axis of the level is horizontal, a bubble is centered with respect to graduations and thereby indicates that the level is level. When the level is rotated so that the top exterior surface is aligned downwardly, the bubble is centered due to the effect of surface tension acting upon the bubble and against the interior side-walls.

Specifically, the bubble level comprises a base and a vial. The base includes two arcuate ends, two slightly outwardly bowed sides, and a substantially flat top surface. The vial includes two substantially flat exterior ends, two slightly outwardly bowed exterior sides, and a substantially flat top exterior surface. The top exterior surface of the vial preferably includes graduations which are substantially centered with respect to the top exterior surface. Also, the vial includes two inwardly sloped substantially flat triangularly shaped interior end-walls and two inwardly sloped outwardly bowed interior side-walls. As it has been described herein above, the interior side-walls are aligned at an approximately forty-five degree angle to the exterior sides and the top exterior surface of the vial. Additionally, the interior side-walls meet slightly below the top exterior surface at an approximately ninety degree angle to form an arcuate apex along the longitudinal axis of the vial. The apex is closest to the top exterior surface of the vial near a middle of the top exterior surface. The apex curves slightly away from the top exterior surface as it nears the two interior end-walls of the vial. The middle of the vial is preferably aligned with the midpoint of the graduations. During manufacturing, a liquid is injected between the base and the vial through a hole in the base in sufficient quantity so as to form the bubble. The bubble is large enough so as to not be able to form a true spherical shape at any point between the base and the vial. Light incident upon either of the interior side-walls where the bubble is present meets an air interface at the approximately forty-five degree angle of the interior side-wall. The air interface causes the light to reflect at an approximately ninety degree angle. Therefore, light entering the top exterior surface will be reflected off one of the interior side-walls adjacent the bubble and out one of the exterior sides of the vial. When light is incident upon either one of the exterior sides or the top exterior surface of the vial, from within the vial, a portion of the light is reflected. Thus, when light enters one of the exterior sides of the vial and becomes incident upon one of the interior side-walls, it is reflected toward the top exterior surface of the vial. When the light is incident upon the top exterior surface, from within the vial, a portion of the light is reflected back toward the interior sidewall. The light is again reflected off the interior side-wall toward the exterior side of the vial.

When the longitudinal axis of the bubble level is substantially horizontal, the bubble will be substantially centered with respect to the marks and thereby indicate that the bubble level is level. When the bubble level is rotated so that the top exterior surface is aligned upwardly, the bubble is centered due to the fact that the middle of the apex is closest to the top exterior surface of the vial. When the bubble level is rotated so that either one of the exterior sides is aligned upwardly, the bubble is centered due to the fact that the interior side-walls are bowed outwardly, as discussed above. The highest point is where a middle of the interior side-wall meets the base. The middle of the interior side-wall is also aligned with the marks, such that the bubble is centered adjacent the midpoint of the marks. When the bubble level is rotated so that the top exterior surface is aligned downwardly, the bubble is centered due to the effect of surface tension acting upon the bubble and against the interior side-walls.

Such devices are complex and expensive.

The bubble level by U.S. Pat. No. 6,968,626 describes the level device has a 45° prism attached to the top surface, so that the image of the bubble vial is deflected along a horizontal axis. The prism is rotatable to permit changing the viewing angle in a horizontal plane.

The bubble level includes level rests on the surface (being leveled by adjustments), with the sensing bubble on the top surface and therefore viewable from above. The bottom surface of level is the reference surface. Prism rests on the top surface of level, with a lower portion in contact with the surface and an upper portion, separated from the lower portion by half silvered mirror. Mirror is illustratively oriented at an angle of 45 degrees with respect to the reference surface on the bottom of level, so that the image of the bubble travels horizontally when the reference surface is horizontal. Such half silvered mirrors are conventional in the optical field and have the well known property that light from source above the prism will pass through the reflective surface, while light reflected from the bubble, in fluid, referred to as the image of the bubble, traveling upward is reflected off to the left.

The mount of the adjustable prism has a locking mechanism for the desired viewing angle. The prism rests on feet, each of which has an adjusting screw. With this arrangement, the angle of surface may be adjusted such that the line of travel of the bubble image is slightly above or below the horizontal. With this option it is possible for the line of sight (or line of travel of the image) to be adjusted to clear obstacles that would block the view of a level with a non-adjustable prism. Any of screws may be locked in palace to maintain a desired view once it has been adjusted. Optionally, the line of sight may be tilted up or down (as indicated by the arrow at the upper left corner of the prism) to clear obstacles or it may be raised or lowered while maintaining a horizontal orientation (by turning all the screws the same amount) to lower or raise the line of sight to clear an obstacle. The prism can be rotated about a vertical axis. With this option, line of sight is rotated to clear obstacles or to permit the operator to move to a different adjustment location.

This device inherent the same deficiencies and is expensive and complex too.

Therefore, the mentioned known devices have the described above deficiencies which are eliminated in the improved precision level device.

While the mentioned above prior art fulfill their respective, particular objectives and requirements, the mentioned inventions do not disclose, teach and/or suggest the level device including the visualization of the line of level instead of the air bubble in the predetermined zone (marks) on the vial.

Those skilled in the art will readily observe that numerous modifications and advantages of the improved precision level device may be made while retaining the teachings of the invention.

Thus, the known prior art do not provide the efficient, non-expensive (without optical elements), and convenient precision level device according to the present invention substantially departs from the devices of the prior art.

OBJECT AND ADVANTAGES OF THE INVENTION

Accordingly, several objects and advantages of the present invention are to provide the improved precision level device:

It is another object of the invention to provide an efficient precision level device.

It is further object of the invention to increase a precision of the level.

It is still another object of the invention to provide a non-complex and non-expensive precision level device.

DESCRIPTION OF THE DRAWING

In order that the invention and the manner in which it is to be performed may be more clearly understood, embodiments thereof will be described by way of example with reference to the attached drawings, of which:

FIG. 4 is a simplified front view of the improved precision level device with the magnetic element.

FIG. 5 is a simplified cross-sectional view of the improved precision level device with the magnetic element.

SUMMARY OF THE INVENTION

Figure 1:
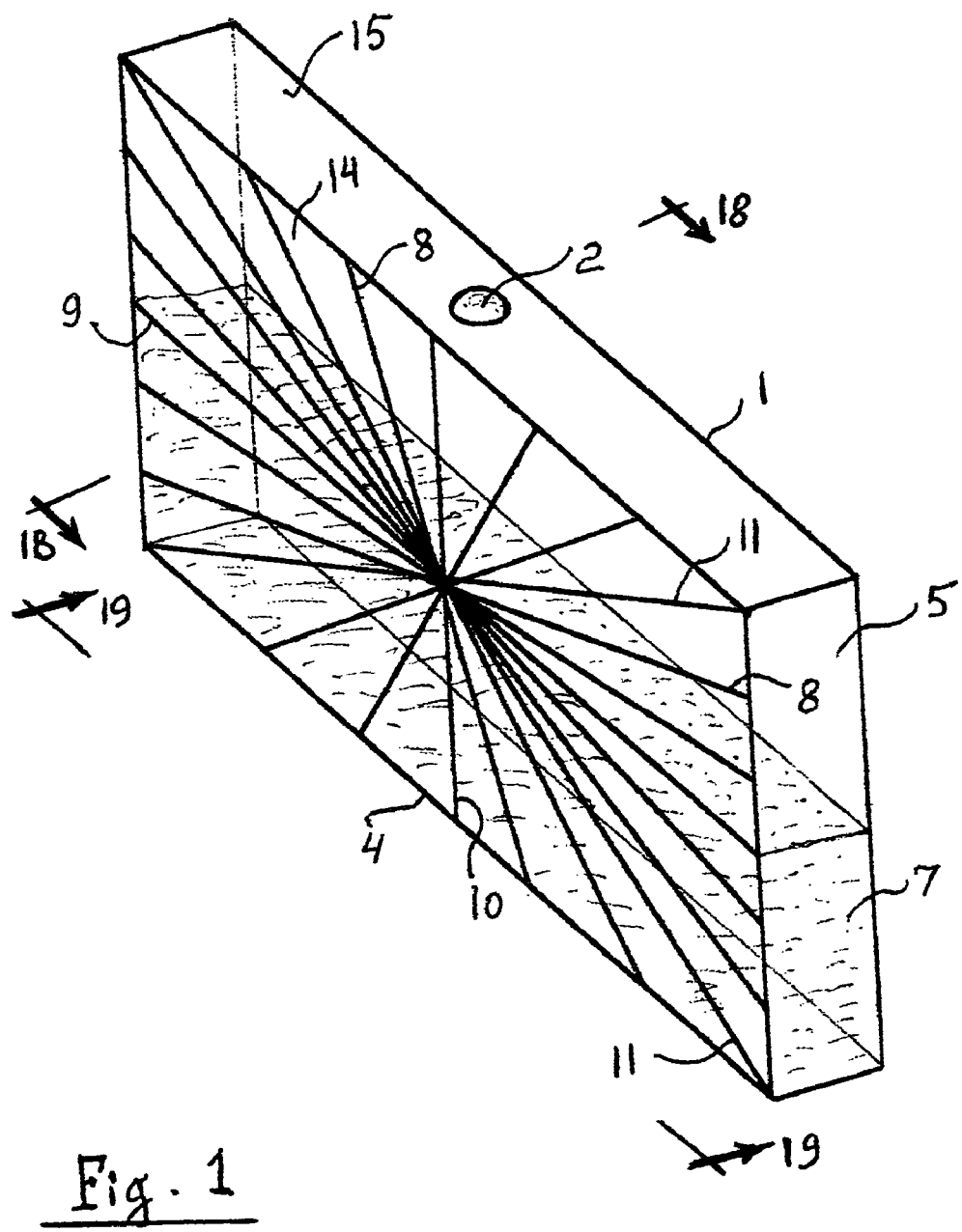
FIG. 1 is a simplified spatial view of the improved precision level device.

In view of the foregoing disadvantages inherent in the known prior art, the present invention provides an improved precision level device. As such, the general purpose of the present invention, which will be described hereinafter in greater details, is to provide the level device, which has many of the advantages of the precise viewable evaluation of the predetermined level mentioned heretofore and many novel features that result convenient, not complex level, which is not anticipated, rendered obvious, suggested or even implied by any of prior art methods and dental devices, either alone or in any combination thereof.

To attain this, the present invention generally comprises the device providing the predetermined level. An improved precision level device includes a transparent body including an aperture with a cap, a lower horizontal wall and upper horizontal wall of the transparent body, the first vertical wall and second vertical wall of the transparent body, recess, fluid, graduation line(s), horizontal graduation line, vertical graduation line, diagonal graduation line(s), magnetic element, and a front wall of the transparent body.

DESCRIPTION OF THE PREFERRED EMBODIMENTS

With reference now to the drawings, and particularly to FIGS. 1-5 thereof, an improved precision level device embodying the principles and concepts of the present invention.

Referring to FIGS. 1-5, an improved precision level device comprises a transparent body 1 including an aperture 3 with a cap 2, a lower horizontal wall 4 and upper horizontal wall 15 of the transparent body 1, the first vertical wall 5 and second vertical wall 16 of the transparent body 1, recess 6, fluid 7, graduation line(s) 8, horizontal graduation line 9, vertical graduation line 10, diagonal graduation line(s) 11, magnetic element 12, front wall 14 of the transparent body 1.

The transparent body 1 may be made of solid (not flexible) transparent material (e.g., may be pressed from a plastic, etc.). The aperture 3 (FIGS. 2, 3) is located in the upper horizontal wall 15 of the transparent body 1. The cap 2 (FIGS. 1-4) is intended to prevent a leakage of the fluid 7 from the recess 6 located inside the transparent body 1.

Figure 2:
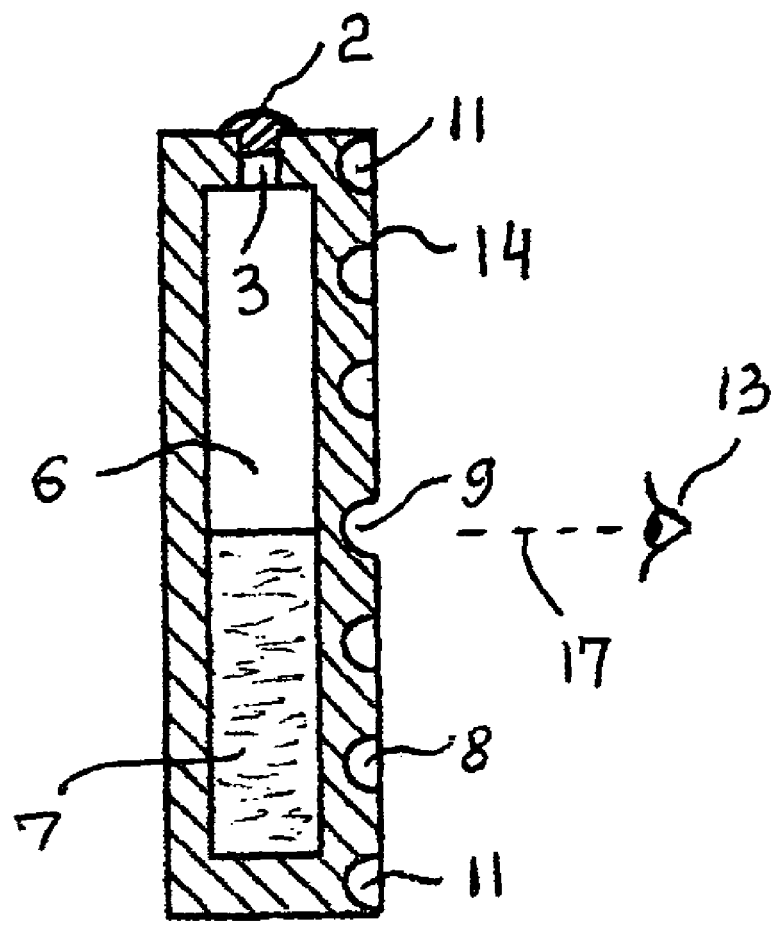
FIG. 2 is a simplified cross-sectional view of the improved precision level device.
Figure 3:
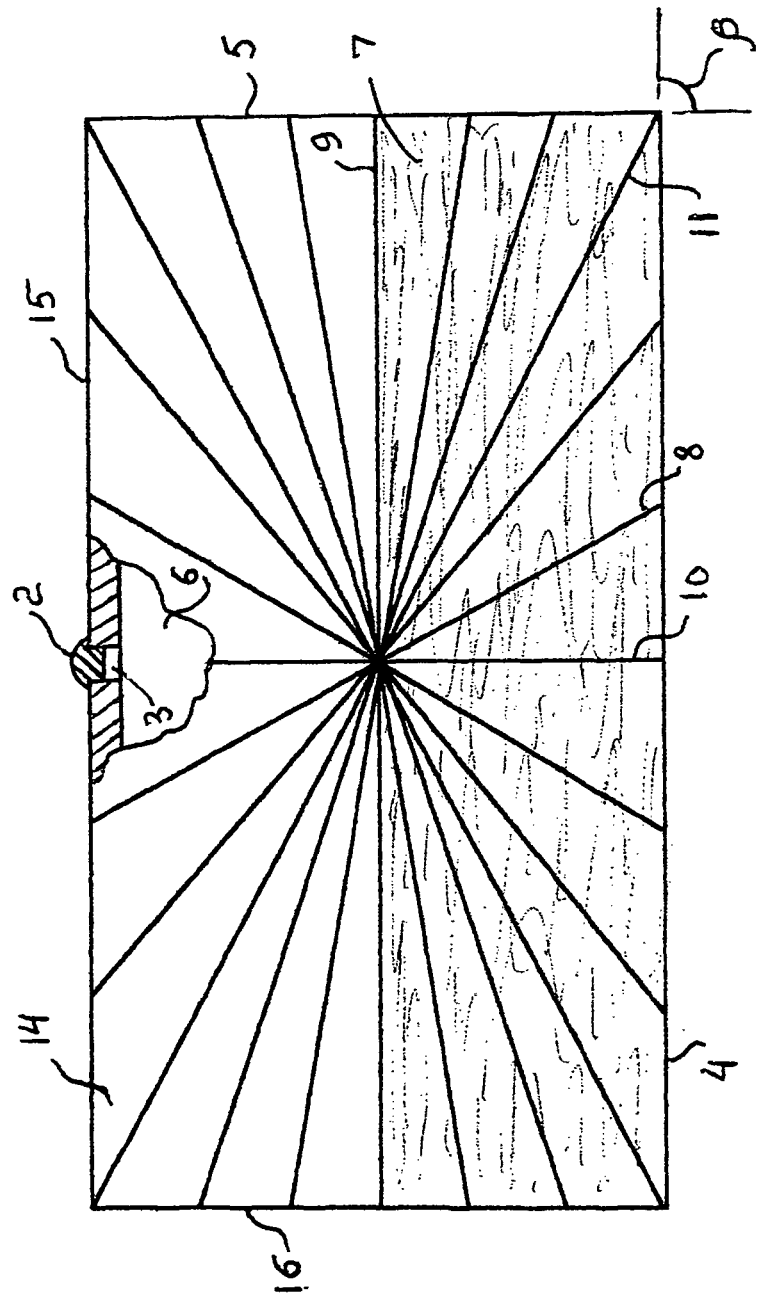
FIG. 3 is a simplified front view of the improved precision level device.

Referring to FIGS. 1, 3, 4, each graduation line 8 is as example located under angle of 15°, but the graduation lines may be in presence under any predetermined angles. Each diagonal graduation line is located under angle of 45°. The horizontal graduation line 9 is precisely parallel to the upper horizontal wall 15 and lower horizontal wall 4, and the vertical graduation line 10 is precisely parallel to the vertical wall(s). The graduation lines 8-11 (FIGS. 1-4) may be engraved in the front wall 14 of the transparent body 1, as it is shown in FIG. 2, or may be printed (painted) on the front wall 14.

The transparent body 1 is a precise rectangle (the angle "β" (FIG. 3) between the lower horizontal wall 4, as well as between the upper horizontal wall 15, and the vertical wall 5 is 90° [β=90°]).

The predetermined quantity of a fluid 7 (or any kind of liquid may be used, e.g., such as water, etc.) is placed into the recess 6 in such manner that the upper line (level) of fluid 7 is precisely coincides with the horizontal graduation line 9 when the viewer's eye 13 (FIG. 2) is located against to the front wall 14 (under angle of 90°—perpendicularly to the front wall 14) of the transparent body 1 located precisely horizontally. The improved precision level device operates as follows. For leveling the subject (not shown) to be located precisely horizontally, the lower horizontal wall 4 rests on the horizontally located subject, and if the upper line (level) of fluid 7 is precisely coincides with the horizontal graduation line 9 and with the viewer eye's line of sight 17, located perpendicularly (under angle of 90°) to the front wall 14 of the transparent body 1, as it is shown in FIG. 2, then the subject has the precise horizontal position.

For leveling the subject (not shown) to be located precisely vertically, the first wall 5 or second wall 16 of the transparent body 1 rests on the vertically located subject, and if the upper line (level) of fluid 7 is precisely coincides with the horizontal graduation line 9 and with the viewer eye's line of sight 17, located perpendicularly (under angle of 90°) to the front wall 14 of the transparent body 1, as it is shown in FIG. 2, then the subject has the precise vertical position. The magnetic element 12 may be attached (e.g., glued) to the first vertical wall 5 (FIG. 4) or to the second vertical wall 16 of the transparent body 1 (the coupling of the magnetic element 12 and the second vertical wall 16 is not shown). The magnetic element 12 (FIG. 4) may be successfully used for leveling of the vertically located subjects (not shown).

Also, in contrast to the known air bubble leveling devices, the improved precision level device provides the leveling of the subject (not shown) to be located precisely under the angle determined by the graduation line(s). For leveling the subject (not shown) to be located precisely under predetermined angle, the lower horizontal wall 4 of the transparent body 1 rests on the subject, located under the angle, and if the upper line (level) of fluid 7 is precisely coincides with the appropriate graduation line 8 responding to the predetermined angle and with the viewer eye's line of sight 17, located perpendicularly (under angle of 90°) to the front wall 14 of the transparent body 1, then the subject has the precise position under the predetermined angle.

Additionally, it should be understood that the improved precision level device presented herein is of the rectangle form, but the improved precision level device may be of hemicircular form or triangular form.

CONCLUSION, RAMIFICATION AND SCOPE

Accordingly the reader will see that, according to the invention, I have provided an improved precision level device. There has thus been outlined, rather broadly, the more important features of the invention. In this respect, it is understood that the invention is not limited in its application to the details of steps, construction and to the arrangements of the components set forth in the description and/or drawings. The invention is capable of other embodiments and of being practiced and carried out in various ways. Also, it is to be understood that the phraseology and terminology employed herein are for the purpose of description and should not be regarded as limiting.

While the above description contains many specificities, these should not construed as limitations on the scope of the invention, but as exemplification of the presently-preferred embodiments thereof. Many other ramifications are possible within the teaching to the invention. For example, the improved precision level device may be installed (inserted) into the drawing tool (e.g., rulers, triangles, protractors, etc.), etc.

As such, those skilled in the art will appreciate that the conception, upon which this disclosure is based, may readily be utilized as a basis for the designing of other structures, for carrying out the several purpose of the present invention. It is important, therefore, that the claims be regarded as including such equivalent constructions insofar as they do not depart from the spirit and scope of the present invention.

THE DRAWING REFERENCE NUMERALS

1.—a transparent body;
2.—a cap;
3.—an aperture;
4.—a lower horizontal wall;
5.—a first vertical wall;
6.—a recess;
7.—a fluid;
8.—a graduation line;
9.—a horizontal graduation line;
10.—a vertical graduation line;
11.—a diagonal graduation line;
12.—a magnetic element;
13.—an eye;
14.—a front wall;

15.—an upper horizontal wall;
16.—a second vertical wall;
17.—a line of sight of the eye 13;
18-18.—a cross-sectional view;
19-19—a front view;
20-20—.a cross-sectional view.

What is claimed is:
1. A precision level device comprises
a transparent body of a rectangular form, elongated in a longitude direction, including
   an aperture located in an upper horizontal wall of said transparent body;
   a recess located inside of said transparent body;
   a fluid placed into said recess through said aperture;
   a horizontal graduation line engraved in a front wall of said transparent body or printed on said front wall of said transparent body, wherein an upper line of said fluid coincides with said horizontal graduation line and coincides with a line of sight of an eye of a viewer located perpendicularly against said front wall of said transparent body of said precision level device;
   a vertical graduation line engraved in said front wall of said transparent body or printed on said front wall of said transparent body;
   at least one of a plurality of graduation lines located under an angle to said horizontal graduation line, wherein said at least one of said plurality of graduation lines are engraved in a front wall of said transparent body or printed on said front wall of said transparent body; and
a cap preventing a leakage of said fluid through said aperture from said recess of said transparent body of said precision level device, wherein said cap is located in an upper horizontal wall of said transparent body of said precision level device, and wherein said transparent body of said precision level device comprises a magnetic element which is coupled to a vertical wall of said transparent body of said precision level device.

* * * * *